US011567334B1

(12) United States Patent
Peng et al.

(10) Patent No.: US 11,567,334 B1
(45) Date of Patent: Jan. 31, 2023

(54) REFLECTIVE EYEPIECE OPTICAL SYSTEM AND HEAD-MOUNTED NEAR-TO-EYE DISPLAY DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

(21) Appl. No.: 17/879,297

(22) Filed: Aug. 2, 2022

(30) Foreign Application Priority Data

Aug. 2, 2021 (CN) .......................... 202110879543.5

(51) Int. Cl.
*G02B 27/01* (2006.01)

(52) U.S. Cl.
CPC ..... *G02B 27/0172* (2013.01); *G02B 27/0176* (2013.01); *G02B 2027/0178* (2013.01)

(58) Field of Classification Search
CPC ........ G02B 2027/0178; G02B 27/0172; G02B 27/0176; G02B 27/01
USPC ......................................................... 359/630
See application file for complete search history.

(56) References Cited

U.S. PATENT DOCUMENTS

| 2005/0046954 | A1* | 3/2005 | Achtner ............. | G02B 27/0025 359/630 |
| 2006/0119951 | A1* | 6/2006 | McGuire, Jr. ...... | G02B 27/1026 359/630 |
| 2013/0222896 | A1* | 8/2013 | Komatsu ............ | G02B 27/0172 359/365 |
| 2014/0368921 | A1* | 12/2014 | Choi .................. | G02B 27/0172 359/630 |
| 2015/0192775 | A1* | 7/2015 | Suzuki ............... | G02B 27/0101 359/630 |
| 2016/0320619 | A1* | 11/2016 | Watanabe ................ | G02B 3/06 |
| 2017/0075096 | A1* | 3/2017 | Shi ......................... | G02B 17/08 |
| 2020/0371371 | A1* | 11/2020 | Liang ................. | G02B 27/1066 |

* cited by examiner

*Primary Examiner* — William R Alexander
(74) *Attorney, Agent, or Firm* — Nitin Kaushik

(57) ABSTRACT

The present invention relates to a reflective eyepiece optical system and a head-mounted near-to-eye display device. The system includes: a first optical element and a second optical element arranged successively along an incident direction of an optical axis of human eyes, and a first lens group located on an optical axis of an miniature image displayer. The first optical element is used for transmitting and reflecting an image light from the miniature image displayer. The second optical element includes one optical reflection surface. The first optical element reflects the image light refracted by the first lens group to the second optical element, and then transmits the image light reflected by the second optical element to the human eyes. The effective focal lengths of the first sub-lens group and the second sub-lens group are a combination of positive and negative.

18 Claims, 12 Drawing Sheets

REFLECTIVE EYEPIECE OPTICAL SYSTEM AND HEAD-MOUNTED NEAR-TO-EYE DISPLAY DEVICE

CROSS-REFERENCE TO RELATED APPLICATIONS

The application claims priority to Chinese patent application No. 202110879543.5, filed on Aug. 2, 2021, the entire contents of which are incorporated herein by reference.

TECHNICAL FIELD

The present invention relates to the field of optical technology, and more particularly, to a reflective eyepiece optical system and a head mounted near-to-eye display device.

BACKGROUND

With the development of electronic devices to ultraminiaturization, head-mounted display devices and products are constantly emerging in military, industrial, medical, educational, consumption and other fields, and in a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD element) to the pupil of the user by optical technology to implement virtual magnified images in the near-eye range of the user, so as to provide the user with intuitive, visual images, video, text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the optical system should try its best to achieve such indexes as a large field-of-view angle, high image resolution, low distortion, small field curvature, and a small volume. It is a great challenge for system design and aberration optimization to satisfy the above optical properties at the same time.

In Patent Document 1 (Chinese Patent Publication No. CN101915992A), Patent Document 2 (Chinese Patent Publication No. CN211698430U), Patent Document 3 (Chinese Patent Publication No. CN106662678A), and Patent Document 4 (Chinese Patent Publication No. CN105229514A), a reflective optical system utilizing a combination of traditional optical spherical surfaces and even-order aspherical face shapes is provided respectively, wherein Patent Document 1 adopts a relay scheme, but this scheme adopts a free-form surface reflection means, which greatly increases the difficulty of realizing the entire optical system; the optical systems in the Patent Document 2, Patent Document 3 and Patent Document 4 use reflective optical systems, but the basic optical structures vary greatly from one to another due to different application fields, such as in terms of a matching relationship between a lens face shape and a gap between the lenses.

Patent Document 5 (Chinese Patent Publication No. CN207081891U) and Patent Document 6 (Chinese Patent Publication No. CN108604007A) provide an eyepiece optical system that adopts a reflex means, which ensures high-quality imaging; however its optical structure is often limited to single lens reflection, thereby greatly limiting a performance ratio of the entire optical structure.

To sum up, the existing optical structures not only have problems such as heavy weight, small field-of-view angle, and insufficient optical performance, but also have problems such as difficulty in processing and mass production due to the difficulty of implementation.

SUMMARY

The technical problem to be solved by the present invention is that the existing optical structure has the problems of heavy weight, low image quality, distortion, insufficient field-of-view angle, and difficulty in mass production. Aiming at the above-mentioned defects of the prior art, a reflective eyepiece optical system and a head-mounted near-to-eye display device are provided.

The technical solutions addressed in the present invention to solve the technical problem thereof are as follows: constructing a reflective eyepiece optical system, including: a first optical element and a second optical element arranged successively along an incident direction of an optical axis of human eyes, and a first lens group located on an optical axis of a miniature image displayer; the first optical element is used for transmitting and reflecting an image light from the miniature image displayer; the second optical element includes an optical reflection surface, and the optical reflection surface is concave to the human eyes; the first optical element reflects the image light refracted by the first lens group to the second optical element, and then transmits the image light reflected by the second optical element to the human eyes;

an effective focal length of the eyepiece optical system is $f_w$, an effective focal length of the first lens group is $f_1$, an effective focal length of the second optical element is $f_2$, and $f_w$, $f_1$, $f_2$ satisfy the following relations (1), (2):

$$f_1/f_w < -0.50 \quad (1);$$

$$f_2/f_w < -0.70 \quad (2);$$

the first lens group comprises a first sub-lens group and a second sub-lens group arranged coaxially and successively along the optical axis direction from human eye viewing side to the miniature image displayer side; the effective focal lengths of the first sub-lens group and the second sub-lens group are a combination of positive and negative; the effective focal length of the first sub-lens group is $f_{11}$, the effective focal length of the second sub-lens group is $f_{12}$, and $f_{11}$, $f_{12}$ and $f_1$ satisfy the following relations (3), (4):

$$0.63 < f_{11}/f_1 \quad (3);$$

$$f_{12}/f_1 < -0.90 \quad (4).$$

Further, the distance along the optical axis between the first optical element and the second optical element is $d_1$, the distance along the optical axis between the first optical element and the first lens group is $d_2$, and $d_1$ and $d_2$ satisfy the following relation (5):

$$0.69 < d_2/d_1 \quad (5).$$

Further, a maximum effective optical caliber of the second optical element is $\varphi_2$, which satisfies the following relation (6):

φ₂<70 mm         (6).

Further, the first sub-lens group is composed of two lenses, which are respectively a first lens distant from the miniature image displayer side and a second lens proximate to the miniature image displayer side; the first lens is a negative lens and the second lens is a positive lens.

Further, the effective focal length of the first lens is $f_{111}$, the effective focal length of the first sub-lens group is $f_{11}$, and $f_{111}$ and $f_{11}$ satisfy the following relation (7), $$2.41 < |f_{111}/f_{11}| \quad (7).$$

Further, the effective focal length $f_{11}$ of the first sub-lens group, the effective focal length $f_{12}$ of the second sub-lens group, the effective focal length $f_1$ of the first lens group, and the effective focal length $f_{111}$ of the first lens farther satisfy the following relations (8), (9), (10):

$$0.63 < f_{11}/f_1 < 0.71 \quad (8);$$

$$2.41 < f_{111}/f_{11} < 5.30 \quad (9);$$

$$-1.16 < f_{12}/f_1 < -0.90 \quad (10).$$

Further, the optical surface of the first lens proximate to the human eye side is convex to the human eyes.

Further, the second sub-lens group comprises a third lens adjacent to the first sub-lens group; the third lens is a negative lens; and the effective focal length of the third lens is $f_{121}$, and $f_{121}$ satisfies the following relation (11):

$$f_{121} < -9.70 \quad (11).$$

Further, the optical surface of the third lens proximate to the miniature image displayer side is concave to the miniature image displayer side.

Further, the first optical element is a planar transflective optical element; a reflectivity of the first optical element is $Re_1$, and $Re_1$ satisfies relation (12):

$$20\% < Re_1 < 80\% \quad (12).$$

Further, a reflectivity of the optical reflection surface is $Re_2$, and $Re_2$ satisfies the following relation (13):

$$20\% < Re_2 \quad (13).$$

Further, an angle of optical axis between the first lens group and the second optical element is $\lambda_1$, and $\lambda_1$ satisfies the following relation (14):

$$55° < \lambda_1 < 120° \quad (14).$$

Further, the eyepiece optical system further includes a planar reflective optical element located between the first lens group and the first optical element; the planar reflective optical element reflects the image light refracted by the first lens group to the first optical element, the first optical element reflects the image light to the second optical element, and then transmits the image light reflected by the second optical element to the human eyes;

the angle between the first lens group and the first optical element is $\lambda_2$, and $\lambda_2$ satisfies the following relation (16):

$$60° \leq \lambda_2 \leq 180° \quad (16).$$

Further, the second optical element includes two coaxial optical surfaces of the same face shape.

Further, the first lens group includes one or more even-order aspherical face shapes; both optical surfaces of the second optical element are even-order aspherical face shapes.

Further, the even-order aspherical face shapes satisfy relation (15):

$$z = \frac{cr^2}{1+\sqrt{1-(1+k)c^2r^2}} + \alpha_2 r^2 + \alpha_4 r^4 + \alpha_6 r^6 + \ldots \quad (15)$$

Further, the material of the second optical element is an optical plastic material.

The present application provides a head-mounted near-to-eye display device, including a miniature image displayer, and further including the reflective eyepiece optical system according to any one of the foregoing content; and the eyepiece optical system is located between the human eyes and the miniature image displayer.

Further, the miniature image displayer is an organic electroluminescent device.

Further, the head-mounted near-to-eye display device includes two identical reflective eyepiece optical systems.

The present invention has the following beneficial effects: the first optical element has transmission and reflection properties, the second optical element includes a reflection surface, the eyepiece optical system composed of the first lens group, the first optical element and the second optical element is used for effectively folding the optical path, which reduces the overall size of the eyepiece optical system and improves the possibility of subsequent mass production, the first lens group includes a first sub-lens group and a second sub-lens group, and the first sub-lens group and the second sub-lens group adopt a combination of positive and negative. On the basis of miniaturization, cost and weight reduction for the article, the aberration of the optical system is greatly eliminated, and the basic optical indicators are also improved, ensuring high image quality and increasing the size of the picture angle. Thus an observer can watch large images of full frame, high definition and uniform image quality without any distortion and get visual experience of high liveness via the present invention, which is suitable for near-to-eye displays and similar devices thereof.

BRIEF DESCRIPTION OF THE DRAWINGS

In order to illustrate the embodiments of the present invention or the technical solutions in the prior art more clearly, the present invention is further illustrated combining the embodiments and drawings attached. The drawings in the following description are only some embodiments of the present invention. For one of ordinary skill in the art, other drawings may be obtained from these drawings without any inventive work.

DETAILED DESCRIPTION OF THE PREFERRED EMBODIMENT

Figure 1:
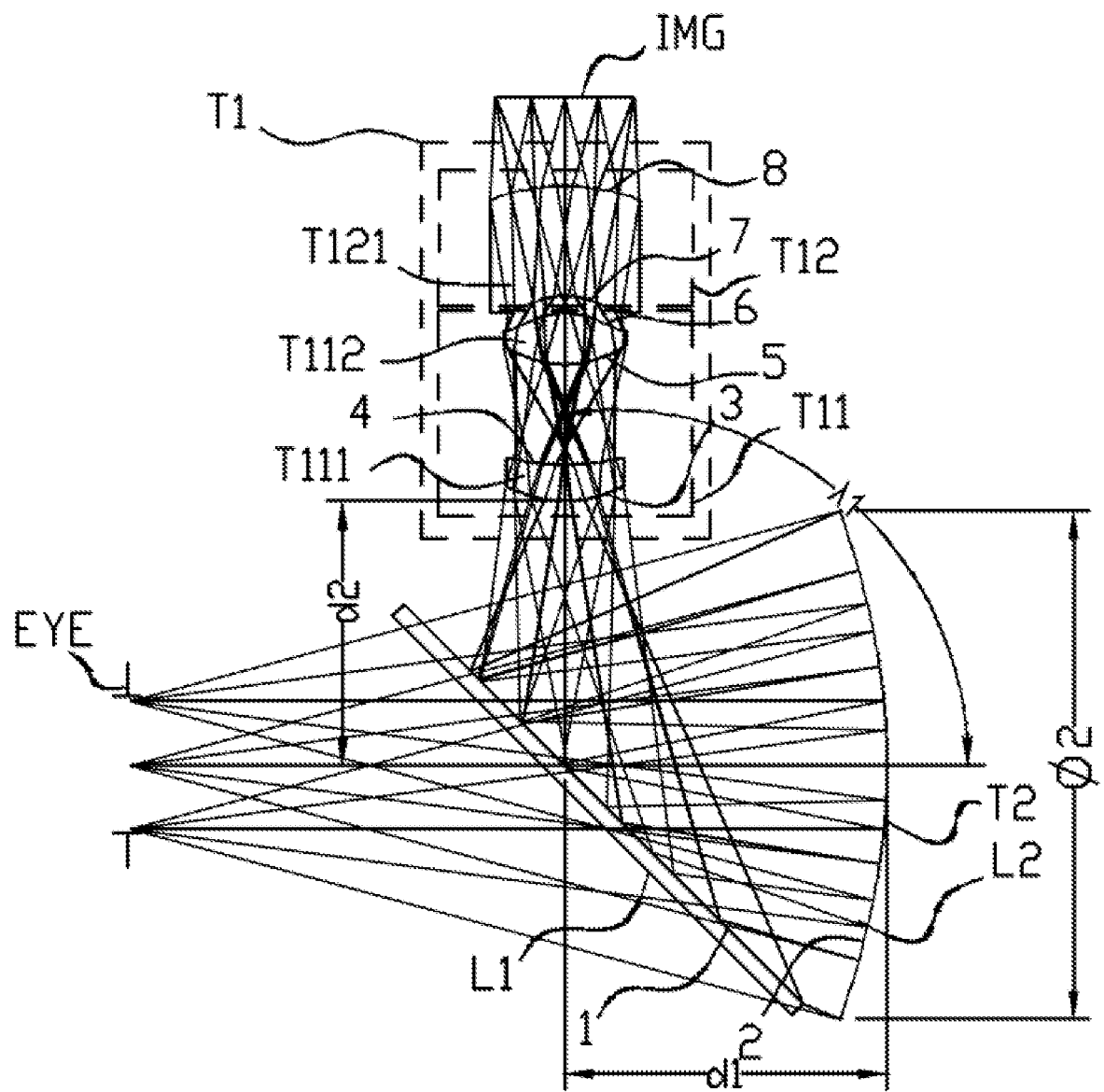
FIG. 1 is an optical path structural diagram of a reflective eyepiece optical system according to a first embodiment of the present invention.
Figure 2:
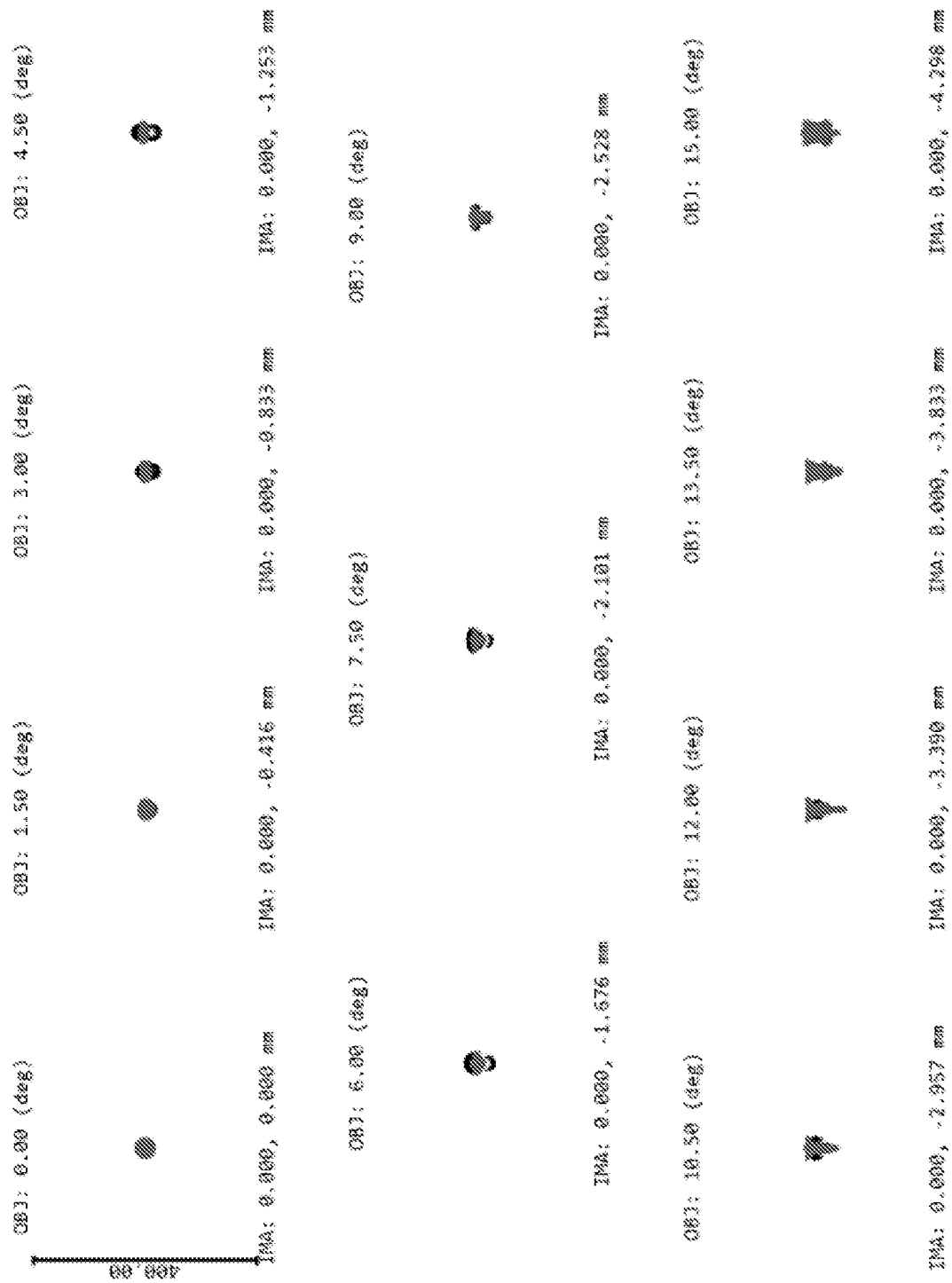
FIG. 2 is a schematic diagram of dispersion spots array of the reflective eyepiece optical system according to the first embodiment of the present invention.
Figure 3A:
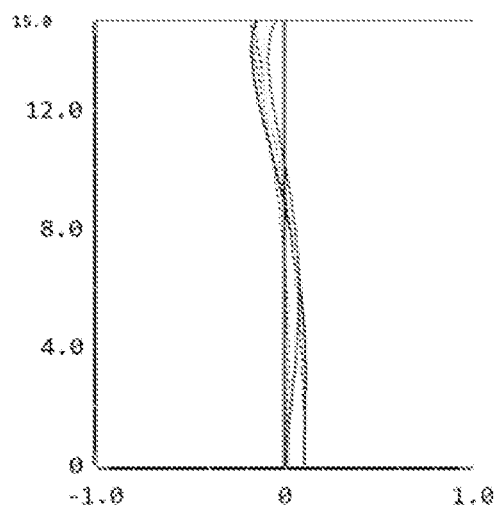
FIG. 3a is a schematic diagram of a field curvature of the reflective eyepiece optical system according to the first embodiment of the present invention.
Figure 3B:
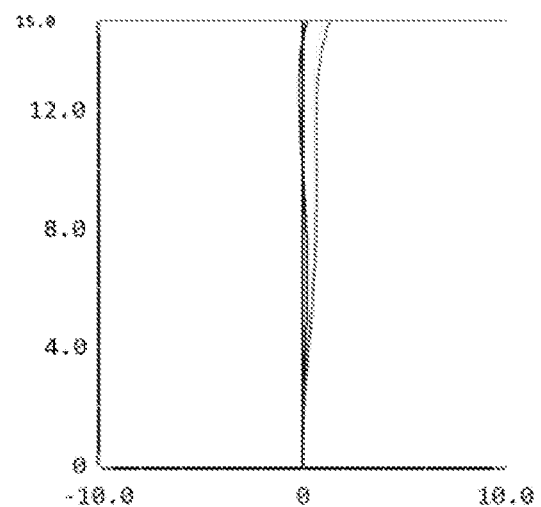
FIG. 3b is a schematic diagram of a distortion of the reflective eyepiece optical system according to the first embodiment of the present invention.
Figure 4:
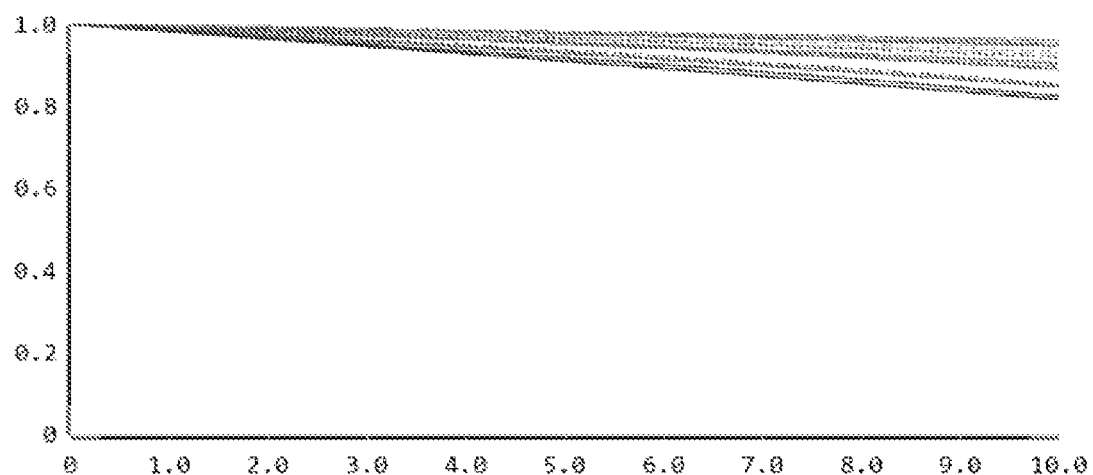
FIG. 4 is a plot of an optical modulation transfer function (MTF) of the reflective eyepiece optical system according to the first embodiment of the present invention.

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by one of ordinary skill in the art without any inventive work based on the embodiments disclosed in the present invention fall into the scope of the present invention.

The present invention constructs a reflective eyepiece optical system, including: a first optical element and a second optical element arranged successively along an incident direction of an optical axis of human eyes, and a first lens group located on an optical axis of a miniature image displayer; the first optical element is used for transmitting and reflecting an image light from the miniature image displayer; the second optical element includes an optical reflection surface, and the optical reflection surface is concave to a human eye viewing direction; and the first optical element reflects the image light refracted by the first lens group to the second optical element, and then transmits the image light reflected by the second optical element to the human eyes;

An effective focal length of the eyepiece optical system is $f_w$, an effective focal length of the first lens group is $f_1$, an effective focal length of the second optical element is $f_2$, and $f_w$, $f_1$, and $f_2$ satisfy the following relations (1) and (2):

$$f_1/f_w < -0.50 \quad (1);$$

$$f_2/f_w < -0.70 \quad (2);$$

wherein, a value of $f_1/f_w$ may be −0.50, −0.579, −1.462, −3.398, −11.295, −23.931, −30.891, −44.751, −51.535, −70.479, etc., and a value of $f_2/f_w$ may be −0.70, −0.79, −1.93, −3.59, −11.35, −31.12, −45.08, −50.91, −71.88, −80.73, −100.649, etc.

The first lens group includes a first sub-lens group and a second sub-lens group arranged coaxially and successively along an optical axis direction from a human eye viewing side to the miniature image displayer side; they effective focal lengths of the first sub-lens group and the second sub-lens group are a combination of positive and negative; the effective focal length of the first sub-lens group is $f_{11}$, the effective focal length of the second sub-lens group is $f_{12}$, and $f_{11}$, $f_{12}$ and $f_1$ satisfy the following relations (3) and (4):

$$0.63 < f_{11}/f_1 \quad (3);$$

$$f_{12}/f_1 < -0.90 \quad (4);$$

wherein, a value of $f_{11}/f_1$ may be 0.63, 0.68, 0.72, 0.88, 1.32, 1.55, 2.35, 3.57, 5.57, 8.79, 9.91, 10.11, 20.22, etc., and a value of $f_{12}/f_1$ may be −0.90, −1.12, −1.88, −2.32, −3.55, −5.25, −7.57, −8.57, −8.79, −9.91, −10.11, −20.22, etc.

In the above relations (1), (2), (3) and (4), the value ranges of $f_1/f_w$, $f_2/f_w$, $f_{11}/f_1$ and $f_{12}/f_1$ are closely related to sensitivities of a correction of system aberrations, a processing difficulty of optical members, and assembly deviations of the optical elements, wherein the value of $f_1/f_w$ in relation (1) is less than −0.50, which improves the processibility of the optical elements in the system; the value of $f_2/f_w$ in relation (2) is less than −0.70, so that the system aberration can be fully corrected, so as to achieve higher quality optical effects. The value of $f_{11}/f_1$ in relation (3) is greater than 0.63, so that the system aberration can be fully corrected, so as to achieve quality optical effects; the value of $f_{12}/f_1$ in relation (4) is less than −0.90, which reduces difficulty of spherical aberration correction and facilitates realization of a large optical aperture.

The first lens group includes two sub-lens groups, which are respectively a first sub-lens group and a second sub-lens group arranged adjacently, the first sub-lens group and the second sub-lens group adopt a combination of positive and negative focal lengths. The negative lens group corrects aberrations and the positive lens group provides focused imaging. The focal length combination of respective lens group is relatively complex, which can better correct aberrations, has better processibility and lower cost, fully corrects the aberrations of the system, and improves the optical resolution of the system.

More importantly, with the transmission and reflection properties of the first optical element and the second optical element to effectively fold the optical path, which reduces the overall size of the eyepiece optical system, and improves the possibility of subsequent mass production. On the basis of miniaturization, cost and weight reduction for the article, the aberration of the optical system is greatly eliminated, and the basic optical indicators are also improved to ensure high imaging quality and increase the size of the picture angle. Thus an observer can watch large images of full frame, high definition and uniform image quality without any distortion and get visual experience of high liveness via the present invention, and the present article is suitable for head-mounted near-to-eye display devices and similar devices.

In the above embodiments, the first optical element may be a polarizer with 75% transmission, 25% reflection or 65% transmission, 35% reflection or a transflective function. The second optical element is a component only with a reflective function, which may be a lens or a metal piece with a reflective function.

As shown in FIG. 1, a first optical element, a second optical element, and a first lens group arranged along an optical axis direction between a human eye viewing side and a miniature image displayer are included. The optical surface closer to the human eye E side is marked as 1, and by analogy (2, 3, 4, 5, 6 . . . respectively from left to right). The light emitted from the miniature image displayer is refracted by the first lens group, and then reflected on the first optical element to the second optical element, and the light is reflected by the second optical elements onto the first optical element, and then transmits to the human eyes through the first optical element.

In a further embodiment, the distance along the optical axis between the first optical element and the second optical element is $d_1$, the distance along the optical axis between the first optical element and the first lens group is $d_2$, and $d_1$ and $d_2$ satisfy the following relation (5):

$$0.69 < d_2/d_1 \qquad (5);$$

wherein, a value of $d_2/d_1$ may be 0.69, 0.83, 0.88, 0.98, 1.55, 2,37, 3.55. 3.88, 3.99, 4.57, 4.89, 4.99, etc.

The lower limit of $d_2/d_1$ in the above relation (5) is greater than 0.69, which reduces difficulty of correcting an off-axis aberration of the system, and ensures that both a central field-of-view and an edge field-of-view achieve high image quality, so that the image quality in the full frame is uniform.

In a further embodiment, a maximum effective optical caliber of the second optical element is $\varphi_2$, which satisfies the following relation (6):

$$\varphi_2 < 70 \text{ mm} \qquad (6);$$

wherein, a value of $\varphi_2$ may be 70, 69, 65, 56, 52, 48, 32, 30, 28, 26, 21, etc., in mm.

In one of the embodiments, the first sub-lens group is composed of two lenses, respectively a first lens distant from the miniature image displayer side and a second lens proximate to the miniature image displayer side; the first lens is a negative lens and the second lens is a positive lens.

In a further embodiment, the effective focal length of the first lens is $f_{111}$, and the effective focal length of the first sub-lens group is $f_{11}$, $f_{111}$ and $f_{11}$ satisfy the following relation (7):

$$2.41 < |f_{111}/f_{11}| \qquad (7);$$

wherein, a value of $|f_{111}/f_{11}|$ may be 2.41, 3.72, 4.88, 5.32, 8.55, 11.25, 23,57, 35.57, 48.79, 69.91, 100.11, 200,22, etc.

The value of $|f_{111}/f_{11}|$ in relation (7) is greater than 2.41, so that the system aberration can be fully corrected, so as to achieve high-quality optical effects.

In a further embodiment, the effective focal length $f_{11}$ of the first sub-lens group, the effective focal length $f_{12}$ of the second sub-lens group, the effective focal length $f_{111}$ of the first lens, and the effective focal length $f_1$ of the first lens group, further satisfy the following relations (8), (9) and (10):

$$0.63 < f_{11}/f_1 < 0.71 \qquad (8);$$

$$2.41 < f_{111}/f_{11} < 5.30 \qquad (9);$$

$$-1.16 < f_{12}/f_1 < -0.90 \qquad (10);$$

wherein, a value of $f_{11}/f_1$ may be 0.63, 0.64, 0.643, 0.649, 0.651, 0.671, 0.683, 0.689, 0.691, 0.693, 0.709, 0.71, etc., a value of $f_{111}/f_{11}$ may be 2.41, 2.44, 2.48, 3.04, 3.92, 4.18, 4.38, 4.68, 5.17, 5.29, 5.30, etc., and a value of $f_{12}/f_1$ may be −1.16, −1.158, −1.14, −1.02, −1.01, −0.985, −0.977, −0.963, −0.939, −0.903, −0.90, etc.

By further optimizing the value ranges of the effective focal length of the first sub-lens group, the second sub-lens group, the first lens and the system, the optical performance and difficulty of processing and manufacturing of the optical system are better balanced.

In a further embodiment, the optical surface of the first lens proximate to the human eye side is convex to the human eyes.

In a further embodiment, the optical surface of the third lens proximate to the miniature image displayer side is concave to the miniature image displayer side.

It may further reduce the size of the eyepiece optical system, improve the image quality of the system, correct the distortion, and improve the aberrations such as astigmatism and field curvature of the system, which is beneficial to the high-resolution optical effect of the eyepiece system with uniform image quality across the full frame.

In a further embodiment, the second lens group includes a third lens; the third lens is a negative lens; the effective focal length of the third lens is $f_{121}$, and $f_{121}$ satisfies the following relation (11):

$$f_{121} < -9.70 \qquad (11);$$

wherein, a value of $f_{121}$ may be −9.70, −9.79, −11.5, 22, −23.5, −27.8, −30.5, −44.5, −57.9, −100.1, etc. In the relation (11), the value of $f_{121}$ is less than −9.70, which reduces difficulty of spherical aberration correction and facilitates realization of a large optical aperture.

In a further embodiment, the first optical element is a planar transflective optical element; a reflectivity of the first optical element is $Re_1$, and $Re_1$ satisfies relation (12):

$$20\% < Re_1 < 80\% \qquad (12);$$

wherein, a value of $Re_1$ may be 20%, 21%, 30%, 47%, 52%, 60%, 65%, 70%, 78.9%, 80%, etc.

In a further embodiment, a reflectivity of the optical reflection surface is $Re_2$, and $Re_2$ satisfies the following relation (13):

$$20\% < Re_2 \qquad (13);$$

wherein, a value of $Re_2$ may be 20%, 30%, 47%, 52%, 60%, 65% 70%, 80%, 99%, etc.

In a further embodiment, an angle of optical axis between the first lens group and the second optical element is $\lambda_1$, and $\lambda_1$ satisfies the following relation (14);

$$55° < \lambda_1 < 120° \qquad (14);$$

wherein, a value of $\lambda_1$ may be 55°, 66°, 70°, 90°, 100°, 120°, etc.

In one of the embodiments, the eyepiece optical system further includes a planar reflective optical element located between the first lens group and the first optical element; the planar reflective optical element reflects the image light refracted by the first lens group to the first optical element, the first optical element reflects the image light to the second optical element, and then transmits the image light reflected by the second optical element to the human eyes;

the angle between the first lens group and the first optical element is $\lambda_2$, and $\lambda_2$ satisfies the following relation (16):

$$60° \leq \lambda_2 \leq 180° \qquad (16);$$

wherein, a value of $\lambda_2$ may be 60°, 80°, 90°, 100°, 130°, 140°, 155°, 167°, 180°, etc.

In a further embodiment, the second optical element includes two coaxial optical surfaces of the same face shape.

The aberrations at all levels of the optical system are further optimized and corrected. The optical performance of the eyepiece optical system further improved.

In a further embodiment, the first lens group includes one or more even-order aspherical face shapes; both optical surfaces of the second optical element are even-order aspherical face shapes.

In a further embodiment, the even-order aspherical face shapes satisfy relation (15):

$$z = \frac{cr^2}{1 + \sqrt{1 - (1+k)c^2r^2}} + \alpha_2 r^2 + \alpha_4 r^4 + \alpha_6 r^6 + \ldots \quad (15)$$

wherein, Z is a vector height of the optical surface, c is a curvature at the aspherical vertex, k is an aspherical coefficient, and $\alpha 2,4,6\ldots$ are coefficients of various orders, and r is a distance coordinate from a point on a surface to an optical axis of a lens system.

The aberrations of the optical system (including spherical aberration, coma, distortion, field curvature, astigmatism, chromatic aberration and other higher-order aberrations) are fully corrected, which is beneficial for the eyepiece optical system, while realizing a large angle of view and a large aperture, to further improve the image quality of the central field-of-view and the edge field-of-view reduce the image quality difference between the central field-of-view and the edge field-of-view, achieving more uniform image quality and low distortion in the full frame.

In a further embodiment, the material of the second optical element is an optical plastic material, such as E48R, EP5000, OKP1, etc.

The aberrations at all levels of the eyepiece optical system are fully corrected, and the manufacturing cost of the optical element and the weight of the optical system are also controlled.

The principles, solutions and display results of the above-mentioned eyepiece optical system will be further described below through more specific examples.

In the following examples, the diaphragm E may be the exit pupil of imaging for the eyepiece optical system which is a virtual light exit aperture. When the pupils of the human eyes are at the diaphragm position, the best imaging effect can be observed.

EXAMPLE 1

The eyepiece design data of Example 1 is shown in Table 1 below:

FIG. 1 is an optical path diagram of the eyepiece optical system of Example 1, including: a first optical element L1 and a second optical element T2 arranged successively along the incident direction of the optical axis of the human eyes, and a first lens group T1 located on the optical axis of the miniature image displayer IMG; the first optical element L1 is used for transmitting and reflecting the image light from the miniature image displayer IMG; the second optical element T2 includes an optical reflection surface L2, and the optical reflection surface L2 is concave to the human eye viewing direction; the first optical element L1 reflects the image light refracted by the first lens group T1 to the second optical element T2, and then transmits the image light reflected by the second optical element T2 to the human eyes EYE.

The effective focal length $f_w$ of the eyepiece optical system is −17.933, the effective focal length $f_1$ of the first lens group T1 is 10.76, the effective focal length $f_2$ of the second optical element T2 is 14.35, the distance $d_1$ along the optical axis between the first optical element L1 and the second optical element T2 is 21.4, the distance $d_2$ along the optical axis between the first optical element L1 and the first lens group T1 is 15.0, wherein the first lens group T1 includes a first sub-lens group T11 and a second sub-lens group T12, the effective focal lengths of the first sub-lens group T11 and the second sub-lens group T12 are a combination of positive and negative; the effective focal length $f_{11}$ of the first sub-lens group T11 is 7.06, the effective focal length $f_{12}$ of the second sub-lens group T12 is −9.8, and the first lens group T11 is a positive lens group, and the first sub-lens group T11 is composed of two lenses, respectively a first lens T111 distant from the miniature image displayer IMG side and a second lens T112 proximate to the miniature image displayer IMG side; the first lens T111 is a negative lens, and the second lens T112 is a positive lens; the second sub-lens group T12 includes a third lens T121, and the third lens T121 is a negative lens. The effective focal length $f_{111}$ of the first lens T111 is 17.12. Then $f_1/f_w$ is −0.6, $f_2/f_w$ is −0.8, $f_{11}/f_1$ is 0.66, $f_{111}/f_{11}$ is 2.42, $f_{12}/f_1$ is −0.91, $f_{121}$ is −9.8, $d_2/d_1$ is 0.7, and $\lambda_1$ is 90°.

FIGS. 2, 3a, 3b and 4 are respectively a dispersion spots array diagram, a field curvature, a distortion diagram and a transfer function MTF plot, which reflect that respective field-of-view light in this example has high resolution and small optical distortion in the unit pixel of the image plane (miniature image displayer IMG), the resolution per 10 mm per unit period reaches more than 0.8, the aberration of the optical system and the image drift are well corrected, and a display image of uniformity and high optical performance can be observed through the eyepiece optical system.

TABLE 1

| Surface | Curvature radius (mm) | Thickness (mm) | Lens Refractive Index | Abbe number | Net caliber (mm) | Cone coefficient |
|---|---|---|---|---|---|---|
| Diaphragm | Infinite | 47 | | | 6 | |
| 2 | −41.11057 | −20.00047 | | Infinite | 31.6328 | 1.352193 |
| 3 | Infinite | 16.39922 | | Infinite | 41.96353 | |
| 4 | Infinite | | | | 9.897529 | |
| 5 | −38.06756 | 2.269064 | 1.6595 | 57.385393 | 7.290616 | −97.12905 |
| 6 | 14.53568 | 6.226581 | | | 6.366176 | |
| 7 | 5.974234 | 3.2067 | 1.5176 | 63.502624 | 7.5969 | −1.414913 |
| 8 | −3.649261 | 1.067102 | | | 7.462009 | −3.685511 |
| 9 | −4.576955 | 6.829327 | 1.945958 | 17.943914 | 7.06327 | −6.873938 |
| 10 | −13.30317 | 5.50581 | | | 9.26265 | |
| Image plane | Infinite | | | | 8.679118 | |

EXAMPLE 2

The eyepiece design data of Example 2 is shown in Table 2 below:

TABLE 2

| Surface | Curvature radius (mm) | Thickness (mm) | Lens Refractive Index | Abbe number | Net caliber (mm) | Cone coefficient |
|---|---|---|---|---|---|---|
| Diaphragm | Infinite | 47 | | | 6 | |
| 2 | −47.89936 | −20.00047 | | Infinite | 31.79071 | 1.545037 |
| 3 | Infinite | 25.64605 | | Infinite | 19.23937 | |
| 4 | −11.60022 | 2.887507 | 1.517602 | 63.502624 | 8.967737 | −0.1358227 |
| 5 | 9.149344 | 6.873337 | | | 7.703785 | |
| 6 | 15.08652 | 3.871348 | 1.7433 | 49.335808 | 8.816071 | −1.052904 |
| 7 | −8.252551 | 0.400037 | | | 8.661677 | −3.738249 |
| 8 | −7.5156 | 5.168428 | 1.922867 | 18.895456 | 8.606499 | −2.85595 |
| 9 | −16.16793 | 10.88742 | | | 9.79516 | |
| Image plane | Infinite | | | | 8.642018 | |

Figure 5:
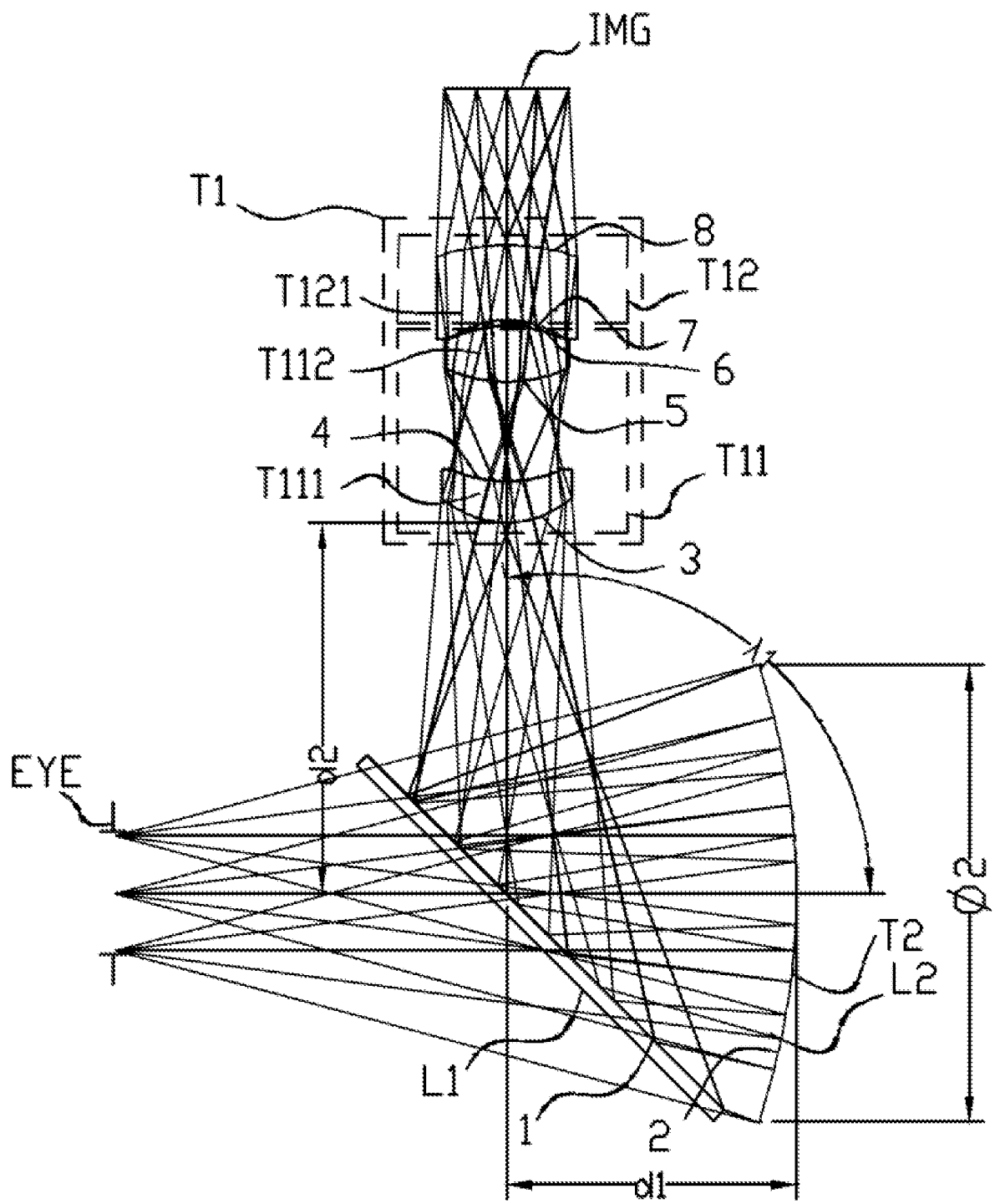
FIG. 5 is an optical path structural diagram of a reflective eyepiece optical system according to a second embodiment of the present invention.
Figure 6:
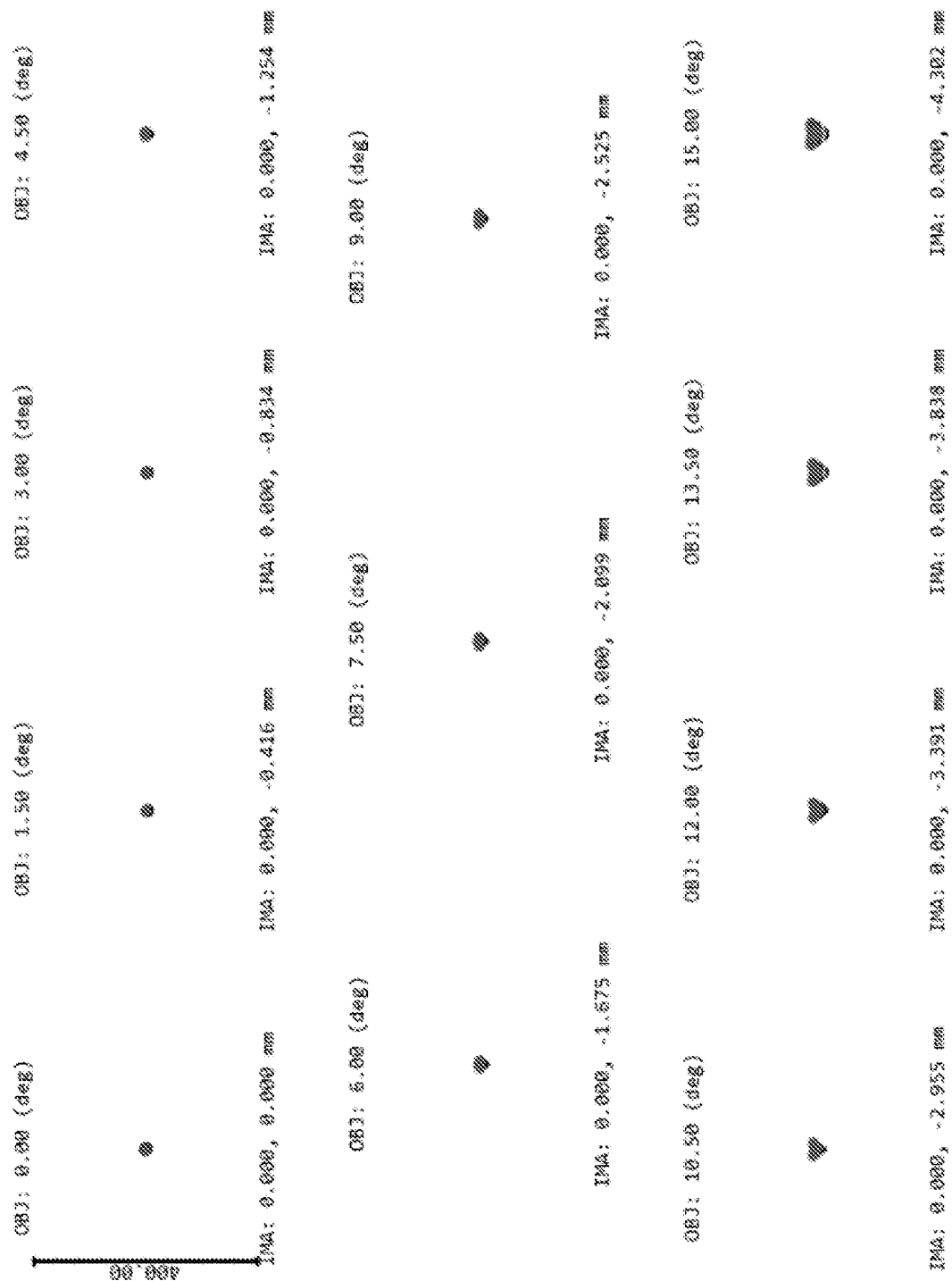
FIG. 6 is a schematic diagram of dispersion spots array of the reflective eyepiece optical system according to the second embodiment of the present invention.
Figure 7A:
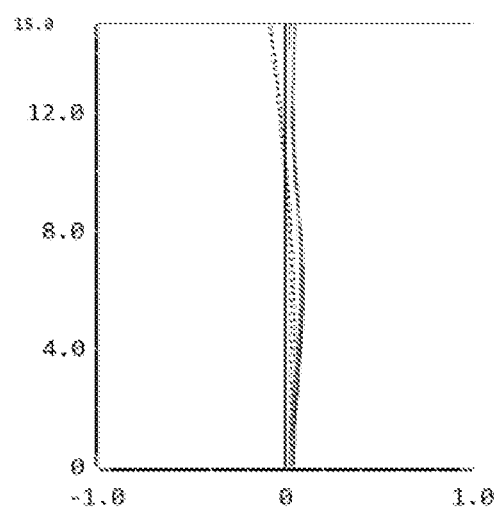
FIG. 7a is a schematic diagram of a field curvature of the reflective eyepiece optical system according to the second embodiment of the present invention.
Figure 7B:
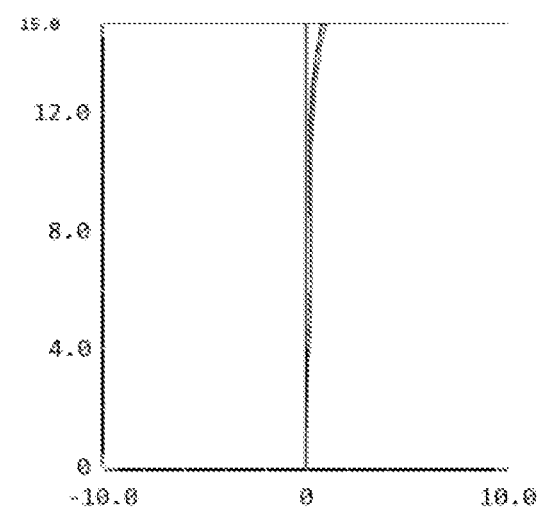
FIG. 7b is a schematic diagram of a distortion of the reflective eyepiece optical system according to the second embodiment of the present invention.
Figure 8:
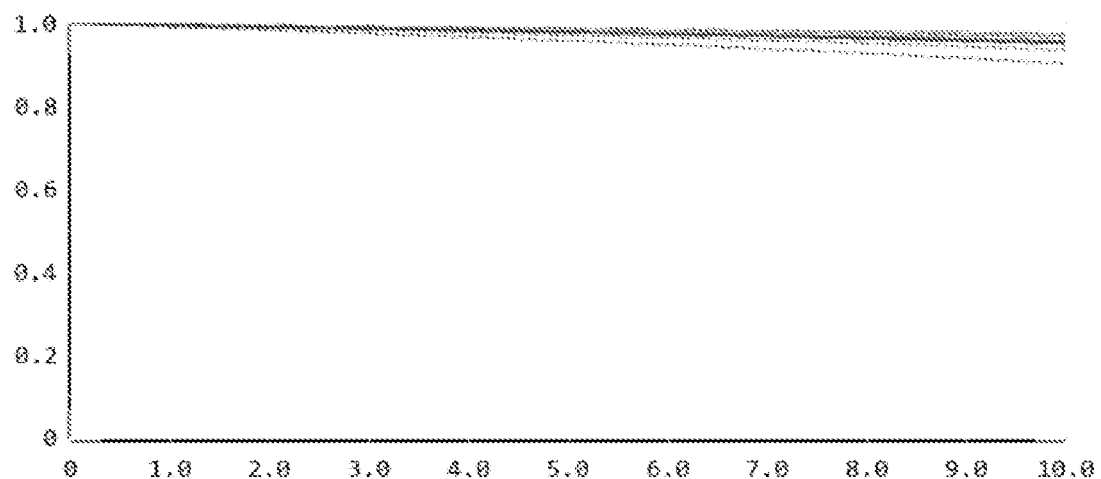
FIG. 8 is a plot of an optical MTF of the reflective eyepiece optical system according to the second embodiment of the present invention.

FIG. 5 is an optical path diagram of the eyepiece optical system of the Example 2, including: a first optical element L1 and a second optical element T2 arranged successively along the incident direction of the optical axis of the human eyes, and a first lens group T1 located on the optical axis of the miniature image displayer IMG; the first optical element L1 is used for transmitting and reflecting the image light from the miniature image displayer IMG; the second optical element T2 includes an optical reflection surface L2, and the optical reflection surface L2 is concave to the human eye viewing direction; the first optical element L1 reflects the image light refracted by the first lens group T1 to the second optical element T2, and then transmits the image light reflected by the second optical element T2 to the human eyes EYE.

The effective focal length $f_w$ of the eyepiece optical system is −15.9, the effective focal length $f_1$ of the first lens group T1 is 12.87, the effective focal length $f_2$ of the second optical element T2 is 23.95, the distance $d_1$ along the optical axis between the first optical element L1 and the second optical element T2 is 20.0, the distance $d_2$ along the optical axis between the first optical element L1 and the first lens group T1 is 25.65, wherein the first lens group T1 includes a first sub-lens group T11 and a second sub-lens group T12, the effective focal lengths of the first sub-lens group T11 and the second sub-lens group T12 is −14.1, and the first lens group T11 is a positive lens group, and the first sub-lens group T11 is composed of two lenses, respectively a first lens T111 distant from the miniature image displayer IMG side and a second lens T112 proximate to the miniature image displayer IMG side; the first lens T111 is a negative lens, and the second lens T112 is a positive lens; the second sub-lens group T12 includes a third lens T121, and the third lens T121 is a negative lens. The effective focal length $f_{111}$ of the first lens T11 is 28.1. Then $f_1/f_w$ is −0.81, $f_2/f_w$ is −1.51, $f_{11}/f_1$ is 0.64, $f_{111}/f_{11}$ is 3.44, $f_{12}/f_1$ is −1.1, $f_{121}$ is −14.1, $d_2/d_1$ is 1.28, and $\lambda_1$ is 90°.

FIGS. 6, 7a, 7b and 8 are respectively a dispersion spots array diagram, a field curvature, a distortion diagram and a transfer function MTF plot, which reflect that respective field-of-view light in this example has high resolution and small optical distortion in the unit pixel of the image plane (miniature image displayer IMG), the resolution per 10 mm per unit period reaches more than 0.8, the aberration of the optical system and the image drift are well corrected, and a display image of uniformity and high optical performance can be observed through the eyepiece optical system.

EXAMPLE 3

The eyepiece design data of Example 3 is shown in Table 3 below:

TABLE 3

Figure 9:
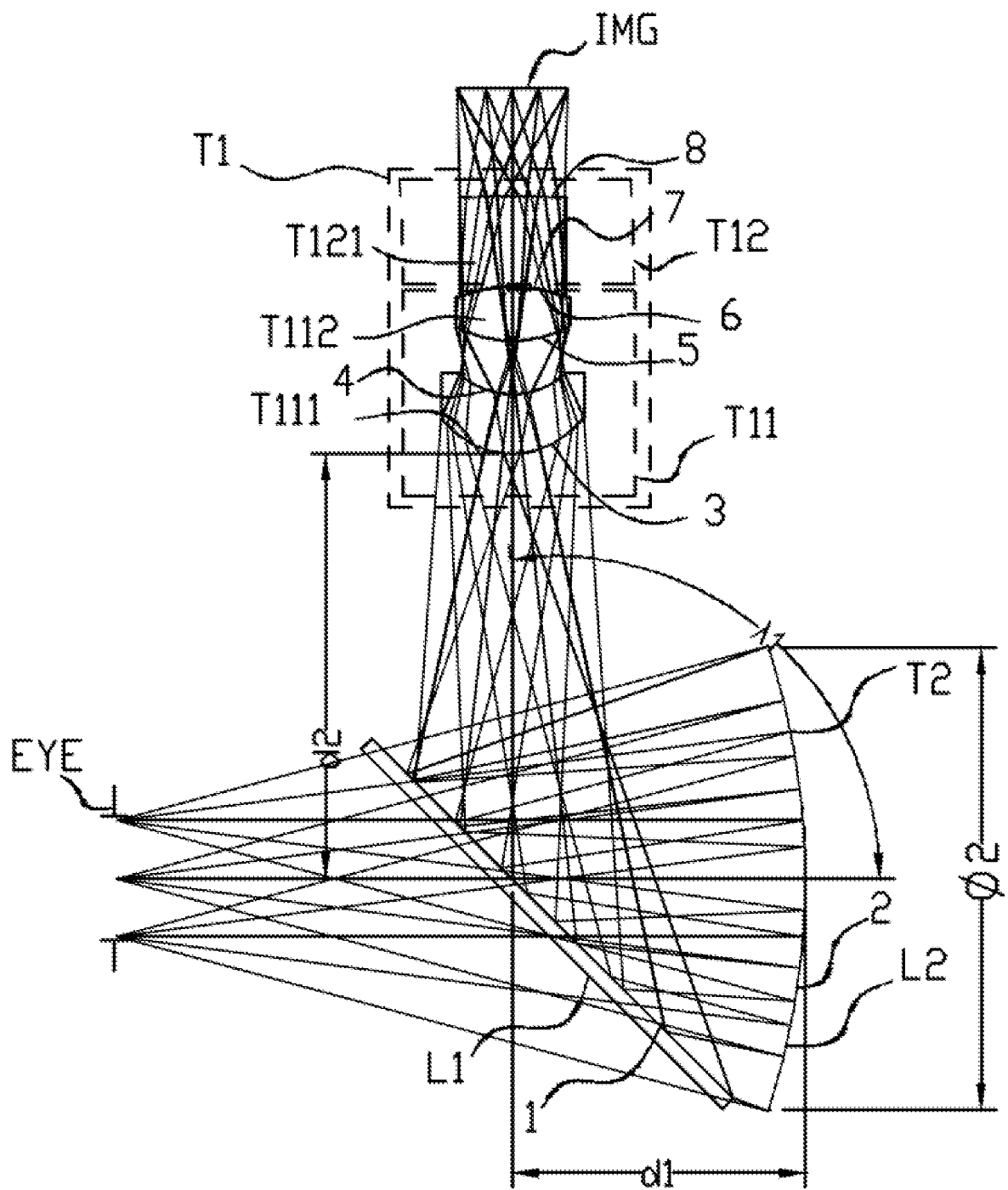
FIG. 9 is an optical path structural diagram of a reflective eyepiece optical system according to a third embodiment of the present invention.
Figure 10:
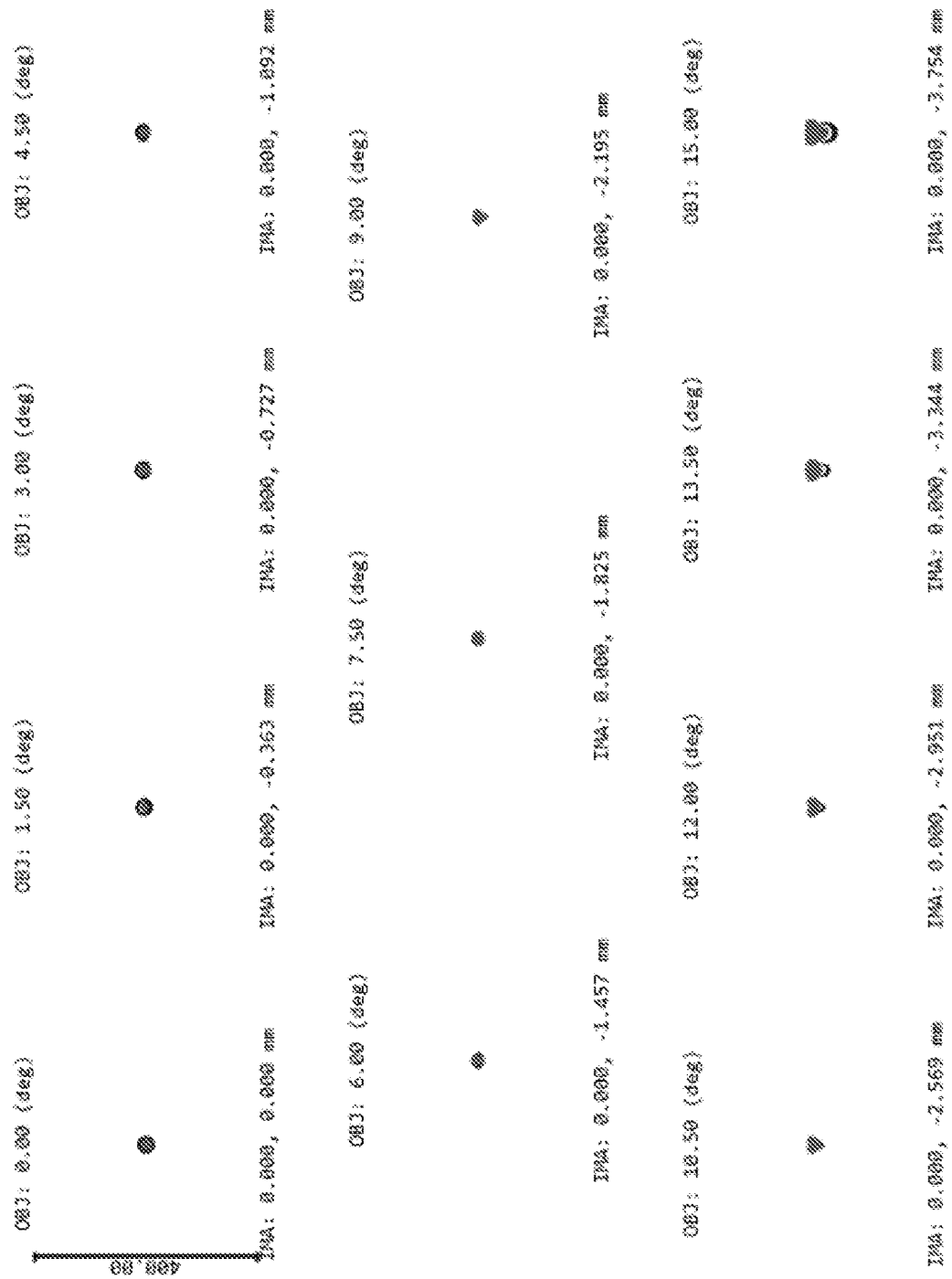
FIG. 10 is a schematic diagram of dispersion spots array of the reflective eyepiece optical system according to the third embodiment of the present invention.
Figure 11A:
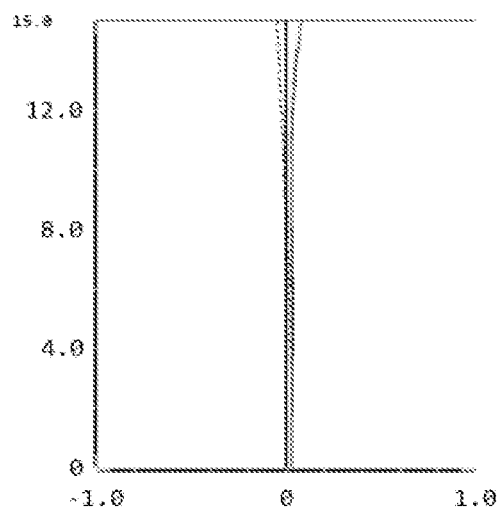
FIG. 11a is a schematic diagram of a field curvature of the reflective eyepiece optical system according to the third embodiment of the present invention.
Figure 11B:
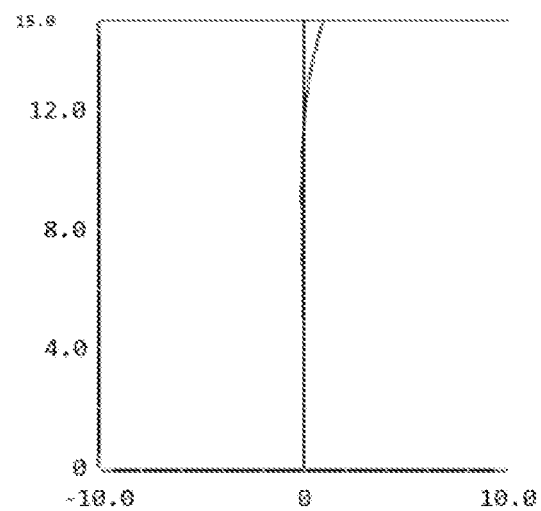
FIG. 11b is a schematic diagram of a distortion of the reflective eyepiece optical system according to the third embodiment of the present invention.
Figure 12:
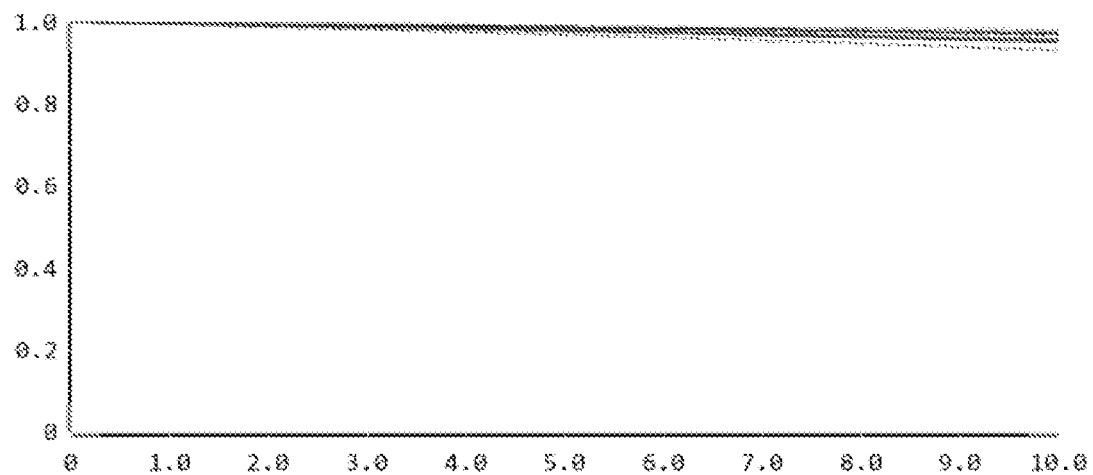
FIG. 12 is a plot of an optical MTF of the reflective eyepiece optical system according to the third embodiment of the present invention.

| Surface | Curvature radius (mm) | Thickness (mm) | Lens Refractive Index | Abbe number | Net caliber (mm) | Cone coefficient |
|---|---|---|---|---|---|---|
| Diaphragm | Infinite | 47 | | | 8 | |
| 2 | −50.44022 | −20 | | Infinite | 31.84217 | 1.579049 |
| 3 | Infinite | 29.1019 | | Infinite | 20.34055 | |
| 4 | −9.77198 | 4.068033 | 1.5928 | 68.345897 | 9.729424 | 0.1252087 |
| 5 | 5.163932 | 3.665553 | | | 7.139224 | |
| 6 | 12.44876 | 3.693746 | 1.816003 | 46.570767 | 7.853824 | −0.5112005 |
| 7 | −10.68799 | 0.06563977 | | | 7.586381 | −5.190833 |
| 8 | −10.32774 | 6.129867 | 1.945958 | 17.943914 | 7.439129 | −1.345337 |
| 9 | −91.61659 | 7.384529 | | | 7.241777 | |
| Image plane | Infinite | | | | 7.579178 | | the second sub-lens group T12 are a combination of positive and negative; the effective focal length $f_{11}$ of the first sub-lens T11 is 8.18, the effective focal length $f_{12}$ of FIG. 9 is a optical path diagram of the eyepiece optical system of Example 3, including: a first optical element L1 and a second optical element T2 arranged successively along the incident direction of the optical axis of the human eyes, and a first lens group T1 located on the optical axis of the miniature image displayer IMG; the first optical element L1 is used for transmitting and reflecting the image light from the miniature image displayer IMG; the second optical element T2 includes an optical reflection surface L2, and the optical reflection surface L2 is concave to the human eye viewing direction; the first optical element L1 reflects the image light refracted by the first lens group T1 to the second optical element T2, and then transmits the image light reflected by the second optical element T2 to the human eyes EYE.

The effective focal length $f_w$ of the eyepiece optical system is −13.89, the effective focal length $f_1$ of the first lens group T1 is 10.66, the effective focal length $f_2$ of the second optical element T2 is 25.22, the distance $d_1$ along the optical axis between the first optical element L1 and the second optical element T2 is 20.0, the distance $d_2$ along the optical axis between the first optical element L1 and the first lens group T1 is 29.1, wherein the first lens group T1 includes a first sub-lens group T11 and a second sub-lens group T12, the effective focal lengths of the first sub-lens group T11 and the second sub-lens group T12 are a combination of positive and negative; the effective focal length $f_{11}$ of the first sub-lens group T11 is 7.47, the effective focal length $f_{12}$ of the second sub-lens group T12 is −12.25, and the first lens group T11 is a positive lens group, and the first sub-lens group T11 is composed of two lenses, respectively a first lens T111 distant from the miniature image displayer IMG side and a second lens T112 proximate to the miniature image displayer IMG side; the first lens T111 is a negative lens, and the second lens T112 is a positive lens; the second sub-lens group T12 includes a third lens T121, and the third lens T121 is a negative lens. The effective focal length $f_{111}$ of the first lens T11 is 39.54. Then $f_1/f_w$ is −0.77, $f_2/f_w$ is −1.82, $f_{11}/f_1$ is 0.70, $f_{111}/f_{11}$ is 5.29, $f_{12}/f_1$ is −1.15, $f_{121}$ is −12.25, $d_2/d_1$ is 1.46, and $\lambda_1$ is 90°.

FIGS. 10, 11a, 11b and 12 are respectively a dispersion spots diagram, a field curvature, a distortion diagram and a transfer function MTF plot, which reflect that respective field-of-view light in this example has high resolution and small optical distortion in the unit pixel of the image plane (miniature image displayer IMG), the resolution per 10 mm per unit period reaches more than 0.8, the aberration of the optical system and the image drift are well corrected, and a display image of uniformity and high optical performance can be observed through the eyepiece optical system.

The data of the above-mentioned Examples 1 to 3 all meet the parameter requirements recorded in the Summary of the present invention, and the results are shown in the following

TABLE 4

|  | $f_1/f_w$ | $f_2/f_w$ | $f_{11}/f_1$ | $f_{111}/f_{11}$ | $f_{12}/f_1$ |
|---|---|---|---|---|---|
| Example 1 | −0.60 | −0.80 | 0.66 | 2.42 | −0.91 |
| Example 2 | −0.81 | −1.51 | 0.64 | 3.44 | −1.1 |
| Example 3 | −0.11 | −1.82 | 0.7 | 5.29 | −1.15 |

The present application provides a head-mounted near-to-eye display device, including a miniature image displayer, and further including the reflective eyepiece optical system according to any one of the foregoing content; the eyepiece optical system is located between the human eyes and the miniature image displayer.

Preferably, the miniature image display is an organic electroluminescent device.

Preferably, the head-mounted near-to-eye display device includes two identical reflective eyepiece optical systems.

To sum up, the first lens group of the reflective eyepiece optical system in the above examples of the present invention includes two sub-lens groups, which are the first sub-lens group and the second sub-lens group, respectively, the effective focal lengths of the first sub-lens group and the second sub-lens group adopt a combination of positive and negative, which fully corrects the aberration of the system and improves the optical resolution of the system. More importantly, with the transmission and reflection properties of the first optical element, the second optical element has a reflection surface, which effectively folds the optical path, reduces the overall size of the eyepiece optical system, and improves the possibility of subsequent mass production. On the basis of miniaturization, cost and weight reduction for the article, the aberration of the optical system is greatly eliminated, and the basic optical indicators are also improved, ensuring high image quality and increasing the size of the picture angle. Thus an observer can watch large images of full frame, high definition and uniform image quality without any distortion and get visual experience of high liveness via the present invention, and the present article is suitable for head-mounted near-to-eye display devices and similar devices.

It should be understood that, for one of ordinary skill in the art, the foregoing description can be modified or altered, and all such modifications and alterations fall into the scope of the attached claims of the present invention.

What is claimed is:

1. A reflective eyepiece optical system, comprised of a first optical element and a second optical element arranged successively along an incident direction of an optical axis of human eyes, and a first lens group located on an optical axis of a miniature image displayer; wherein the first optical element is used for transmitting and reflecting an image light from the miniature image displayer; the second optical element comprises an optical reflection surface, and the optical reflection surface is concave to the human eyes; the first optical element reflects the image light refracted by the first lens group to the second optical element, and then transmits the image light reflected by the second optical element to the human eyes;

an effective focal length of the eyepiece optical system is $f_w$, an effective focal length of the first lens group is $f_1$, an effective focal length of the second optical element is $f_2$, and $f_w$, $f_1$, $f_2$ satisfy the following relations (1), (2):

$$f_1/f_w < -0.50 \tag{1};$$

$$f_2/f_w < -0.70 \tag{2};$$

the first lens group is comprised of a first sub-lens group and a second sub-lens group arranged coaxially and successively along the optical axis direction from a human eye viewing side to the miniature image displayer side; the effective focal length of the first sub-lens group is positive and the effective focal length of the second sub-lens group is negative; the effective focal length of the first sub-lens group is $f_{11}$, the effective focal length of the second sub-lens group is $f_{12}$, and $f_{11}$, $f_{12}$ and $f_1$ satisfy the following relations (3), (4):

$$0.63 < f_{11}/f_1 \tag{3};$$

$$f_{12}/f_1 < -0.90 \tag{4};$$

the first sub-lens group is composed of two lenses, which are respectively a first lens distant from the miniature image displayer side and a second lens proximate to the miniature image displayer side; the first lens is a negative lens and the second lens is a positive lens; the second sub-lens group is comprised of a third lens adjacent to the first sub-lens group; the third lens is a negative lens.

2. The reflective eyepiece optical system according to claim 1, wherein the distance along the optical axis between the optical surface of the first optical element distant from the human eye side and the optical reflection surface in the second optical element is $d_1$, the distance along the optical axis between the optical surface of the first optical element distant from the human eye side and the optical surface in the first lens group closest to the human eye viewing side is $d_2$, and $d_1$ and $d_2$ satisfy the following relation (5):

$$0.69 < d_2/d_1 \quad (5).$$

3. The reflective eyepiece optical system according to claim 1, wherein a maximum effective optical caliber of the second optical element is $\varphi_2$, which satisfies the following relation (6):

$$\varphi_2 < 70 \text{ mm} \quad (6).$$

4. The reflective eyepiece optical system according to claim 1, wherein the effective focal length of the first lens is $f_{111}$, the effective focal length of the first sub-lens group is $f_{11}$, and $f_{111}$ and $f_{11}$ satisfy the following relation (7), $$2.41 < |f_{111}/f_{11}| \quad (7).$$

5. The reflective eyepiece optical system according to claim 1, wherein the effective focal length $f_{11}$ of the first sub-lens group, the effective focal length $f_{12}$ of the second sub-lens group, the effective focal length $f_1$ of the first lens group, and the effective focal length $f_{111}$ of the first lens further satisfy the following relations (8), (9), (10):

$$0.63 < f_{11}/f_1 < 0.71 \quad (8);$$

$$2.41 < f_{111}/f_{11} < 5.30 \quad (9);$$

$$-1.16 < f_{12}/f_1 < -0.90 \quad (10).$$

6. The reflective eyepiece optical system according to claim 1, wherein the optical surface of the first lens proximate to the human eye side is convex to the human eyes.

7. The reflective eyepiece optical system according to claim 1, wherein the effective focal length of the third lens is $f_{121}$, and $f_{121}$ satisfies the following relation (11):

$$f_{121} < -9.70 \quad (11).$$

8. The reflective eyepiece optical system according to claim 7, wherein the optical surface of the third lens proximate to the miniature image displayer side is convex to the miniature image displayer side.

9. The reflective eyepiece optical system according to claim 1, wherein the first optical element is a planar transflective optical element; a reflectivity of the first optical element is $Re_1$, and $Re_1$ satisfies relation (12):

$$20\% < Re_1 < 80\% \quad (12).$$

10. The reflective eyepiece optical system according to claim 1, wherein a reflectivity of the optical reflection surface is $Re_2$, and $Re_2$ satisfies the following relation (13):

$$20\% < Re_2 \quad (13).$$

11. The reflective eyepiece optical system according to claim 1, wherein an angle of optical axis between the first lens group and the second optical element is $\lambda_1$, and $\lambda_1$ satisfies the following relation (14):

$$55° < \lambda_1 < 120° \quad (14).$$

12. The reflective eyepiece optical system according to claim 1, wherein the second optical element comprises two coaxial optical surfaces of the same face shape.

13. The reflective eyepiece optical system according to claim 1, wherein the first lens group comprises one or more even-order aspherical face shapes; and both optical surfaces of the second optical element are even-order aspherical face shapes.

14. The reflective eyepiece optical system according to claim 13, wherein the even-order aspherical face shapes satisfy relation (15):

$$z = \frac{cr^2}{1 + \sqrt{1-(1+k)c^2 r^2}} + \alpha_2 r^2 + \alpha_4 r^4 + \alpha_6 r^6 + \ldots ; \quad (15)$$

wherein, Z is a vector height of the optical surface, c is a curvature at the aspherical vertex, k is an aspherical coefficient, and $\alpha 2,4,6 \ldots$ are coefficients of various orders, and r is a distance coordinate from a point on a surface to an optical axis of a lens system.

15. The reflective eyepiece optical system according to claim 1, wherein the material of the second optical element is an optical plastic material.

16. A head-mounted near-to-eye display device, comprising a miniature image displayer, wherein it further comprises the reflective eyepiece optical system according to claim 1; and the eyepiece optical system is located between the human eyes and the miniature image displayer.

17. The head-mounted near-to-eye display device according to claim 16, wherein the miniature image displayer is an organic electroluminescent device.

18. The head-mounted near-to-eye display device according to claim 16, wherein the head-mounted near-to-eye display device comprises two identical reflective eyepiece optical systems.

* * * * *